United States Patent Office 3,384,664
Patented May 21, 1968

3,384,664
ALKYLATION METHOD FOR PRODUCING PHENYLENEDIAMINES
Frederic N. Schwettmann, Wappingers Falls, N.Y., assignor to Texaco Inc., New York, N.Y., a corporation of Delaware
No Drawing. Filed Sept. 15, 1965, Ser. No. 487,582
5 Claims. (Cl. 260—577)

ABSTRACT OF THE DISCLOSURE

N,N'-dialkyl phenylenediamine is prepared by catalytic alkylation of nitroaniline or phenylenediamine with a ketone utilizing a hydrocarbon-sulfur compound pretreated catalyst. The N,N'-dialkyl phenylenediamine products find use as antioxidants in gasoline.

This invention relates to a method of preparing N,N'-dialkyl phenylenediamine by catalytic alkylation of nitroaniline or phenylenediamine with a carbonyl compound utilizing a novel pretreated catalyst. The invention further relates to said catalyst and the preparation thereof.

The N,N'-dialkyl phenylenediamine products of the method of the invention find widespread use as antioxidants in gasoline. In the past, many processes have been developed for production of the N,N'-dialkyl phenylenediamine. One such process calls for the reaction of a nitroaniline with a dialkyl ketone in the presence of a platinum catalyst which has been pretreated with hydrogen, hydrocarbon or mixtures thereof at a temperature above about 200° F., preferably of the order of 600–1200° F. Although the foregoing prior art process allegedly produces satisfactory yields, it requires a high pretreatment temperature of the catalyst in order to materially enhance the catalyst activity. High pretreatment temperatures undesirably add to the cost of the catalyst in that special handling apparatuses and heating generating equipment are required.

An object of this invention is to provide a catalyst for the catalytic alkylation of nitroaniline or phenylenediamine with a dialkyl ketone which gives improved yields of N,N'-dialkyl phenylenediamine product.

Another object of this invention is to provide a catalyst for the catalytic alkylation of a nitroaniline or phenylenediamine with a dialkyl ketone whose activity in said alkylation is materially increased by pretreatment with liquid aliphatic hydrocarbon-sulfur compound solution at moderate temperatures, i.e., less than about 180° F. Hereinbefore and hereinafter by the term "liquid aliphatic hydrocarbon" I intend any aliphatic and cycloaliphatic hydrocarbon liquids, including mixtures thereof, having an aromatic content of less than 50 wt. percent.

Still another object of the invention is to provide a process for the production of an N,N'-dialkyl phenylenediamine utilizing a catalyst whose activity has been substantially increased by pretreatment with a liquid aliphatic hydrocarbon-sulfur compound solution at moderate temperatures.

In addition to the foregoing objects, additional objects will become apparent in the following disclosure and claims.

In accordance with the foregoing objects of the invention the description of the invention is as follows:

CATALYST AND PRETREATMENT THEREOF

The base catalyst employed in the method of the invention is a standard catalyst utilized in reductive alkylation, namely, a platinum metal on metal oxide carrier. The base catalyst may or may not contain halogen in the form of combined fluorine and/or combined chlorine. By the term "a platinum metal" I intend those metals in Group VIII, Periods 5 and 6 of the Periodic Table such as platinum, rhodium, palladium, ruthenium, osmium and iridium. Examples of the metal oxide carriers contemplated are oxides of a non-precious metal element taken from Groups III to VIII of the Periodic System such as alumina, silica, zirconia, thoria, zinc oxide, mixtures of silica and alumina or mixtures of silica and/or alumina with one or more of the last mentioned oxides. Specifically, the base catalyst composite comprises metal oxide carrier and from about 0.01 to about 10%, preferably about 0.1 to about 2% by weight, of a platinum metal, and if present, from about 0.1 to about 10%, preferably from about 0.2 to 4% by weight, of fluorine or chlorine in combined form. A preferred base catalyst is a composite of platinum and alumina which contain combined chlorine and fluorine. The base catalyst is prepared by standard means, for example, by forming a water soluble compound of the platinum metal such as chloroplatinic acid and comingling an aqueous solution of said acid with metal oxide supporting component, e.g., alumina and evaporating the mixture to dryness after which it is ground and when desired formed into particles of uniform or irregular size and shape, e.g., by pelleting or extrusion. Normally, after the platinum metal has been composited with the supporting metal oxide the composition is calcined in air at a temperature of about 800–1200° F. for a period of about 4 to 8 hours or more and in some cases the calcination treatment in air may be eliminated.

I have discovered that this constitutes one aspect of my invention that when the aforedescribed base catalyst composite is subjected to the following described pretreatment, said catalyst promotes substantially higher yields of N,N'-dialkyl phenylenediamine than untreated catalyst or catalyst which has been subjected to related pretreatment procedures. Specifically, the catalyst pretreatment process of the invention and the resultant novel pretreated catalyst from which it is derived are as follows:

The aforedescribed platinum metal-metal oxide composite is contacted with a liquid aliphatic hydrocarbon-sulfur compound solution having an aromatic content of less than 50 wt. percent, preferably less than 15 wt. percent, and a sulfur content supplied by the sulfur compound of between about 50 p.p.m. and 2 wt. percent, preferably between about 100 and 1000 p.p.m. The contacting is conducted at a temperature advantageously between about 40 and 180° F. and preferably between about 60 and 100° F. and is accomplished normally by contacting methods, for example, soaking the catalyst in the sulfur containing liquid aliphatic hydrocarbon or by passing the sulfur containing liquid aliphatic hydrocarbon over the catalyst, e.g., over the catalyst in a reactor bed at a rate of between about 50 and 200 volumes/volume catalyst/hour. If desired hydrogen may be employed in admixture with the liquid aliphatic hydrocarbon sulfur compound solution in the catalyst pretreatment, e.g., utilizing an $H_2$ pressure of 100–1500 p.s.i.g. Normally, the contacting is conducted for a period of between about 0.5 and 10 hours or more.

One important feature of the pretreatment process is to utilize substantially a non-aromatic hydrocarbon, i.e., a liquid aliphatic hydrocarbon with an aromatic content less than 50 wt. percent, in the pretreatment solution, since the aromatic hydrocarbons are theorized to be adsorbed on the catalyst surface to the exclusion of the sulfur compound. This material feature is established by the yield of N,N'-dialkyl phenylenediamine in that little, if any, increase in yield is observed utilizing a catalyst (1) pretreated with pure aromatic hydrocarbon or (2) pretreated with a sulfur containing pure aromatic hydrocarbon solution.

It is theorized that the increased activity of the catalyst of the invention in the contemplated N,N'-dialkylphenylenediamine manufacture process of the invention is due to the interaction of the catalyst with the liquid aliphatic hydrocarbon and sulfur compound components of pretreatment solution at moderate temperatures. The accomplishment of this increased activity surprisingly does not require the use of elevated pretreatment temperatures.

Although the sulfur content in the sulfur containing aliphatic hydrocarbon pretreatment solution normally ranges between about 100 and 1000 p.p.m., the particular sulfur content in the pretreatment solution required to bring about satisfactory yields in the N,N'-dialkyl phenylenediamine manufacturing process of the invention will depend on the particular process conditions of the phenylenediamine manufacture. For example, one controlling condition is the temperature inside the pre-treated catalyst pores during the contact of the reactants therewith, the lower pore temperatures promoting greater catalytic activity. Therefore, since in a continuous N,N'-dialkyl phenylenediamine manufacturing process the catalyst pore temperatures are higher for a given set of conditions than a batch process, a greater activating sulfur content is required in the catalyst of the continuous N,N'-dialkyl phenylenediamine manufacturing process than the catalyst for the batch process. For example, in a continuous process the base catalyst treated with a pretreatment solution having 320 p.p.m. sulfur content will give materially improved yields of dialkyl phenylenediamine, whereas pretreatment solution sulfur contents of 50 p.p.m. will give only slightly improved yields. However, in a batch process in the production of dialkyl phenylenediamine, sulfur contents in the pretreatment solution of 50 p.p.m. produce a catalyst rendering quite satisfactory yields. It is to be noted, however, the proportional relationship between catalyst activity and catalyst sulfur content does not hold true when the sulfur content of the catalyst becomes too great, therefore, the sulfur content of the catalytic pretreatment solution should be maintained below about 2 wt. percent.

Examples of the liquid aliphatic hydrocarbons contemplated herein for the pretreatment solution are the normally liquid alkanes, alkenes, cycloalkane and cycloalkenes such as cyclohexane, cyclohexene, pentane, hexane, hexene, heptane, heptene, methylcyclohexane, methylcyclopentane, 2-methylhexane, 2,2-dimethylpentane, tridecane and liquid aliphatic hydrocarbon refinery streams such as heavy and light straight run naphthas.

The sulfur compounds which is added to the liquid aliphatic hydrocarbons to give them their desired sulfur content can be hydrogen sulfide or any of the organic sulfur compounds composed of carbon, hydrogen and sulfur which are soluble in liquid aliphatic hydrocarbon such as the dialkyl disulfides, dialkyl sulfide, alkyl disulfide, cyclic sulfides, heterocyclic sulfides and alkyl mercaptans, more specifically, dimethyl disulfide, dimethyl sulfide, butyl disulfide, 1,2-butylene sulfide, methyl mercaptan, hexyl mercaptan, benzyl mercaptan and thiophene. Other suitable sulfur compounds are also those naturally occurring in liquid aliphatic refinery streams such as those found in heavy and light straight run naphthas which have not been subjected to desulfurization.

Examples of such catalyst pretreatment solutions which do not normally require the artificial spiking with a sulfur compound to arrive at a desired sulfur level are undesulfurized liquid aliphatic hydrocarbon refinery streams such as light and heavy straight run napthas having a sulfur content of between about 50 p.p.m. and 2 wt. percent. A specific example of an undesulfurized light straight run naphtha is one having a composition of 2 wt. percent olefins, 2 wt. percent aromatics and 96 wt. percent saturated aliphatics, a Peroxide No.=0.27, Sulfur=320 p.p.m., API Gravity=78° and Distillation Range=91–252° F. A specific example of an undesulfurized heavy straight run naphtha is one having a composition of 10.5 wt. percent aromatics, 1 wt. percent olefins, 88.5 wt. percent saturated aliphatics, Peroxide No.=0.18, Sulfur=70 p.p.m., API Gravity=51.8° and Distillation Range=200–375° F.

CATALYTIC METHOD OF PREPARING N,N'-DIALKYL PHENYLENEDIAMINE

The other aspect of my invention is the use of the aforedescribed pretreated catalyst in the catalytic method of preparing N,N'-dialkyl phenylenediamine from nitroaniline or phenylenediamine, a dialkyl ketone and hydrogen. More particularly, the method of invention comprises contacting an amine selected from the group consisting of phenylenediamine of the general formula:

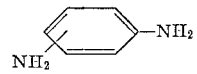

or nitroaniline of the general formula:

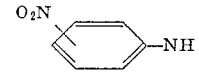

with a dialkyl ketone of the formula:

where R and R' are the same or different alkyl radicals of 1 to 10 carbons under a hydrogen pressure of between 200 and 1500 p.s.i.g. in the presence of between about 0.5 and 15.0 wt. percent of the aforedescribed pretreated platinum metal on metal oxide carrier. The reaction is advantageously conducted at a temperature between about 250 and 350° F. utilizing a mole ratio of amine reactant to ketone of between about 1:5 and 1:16 to form a dialkyl phenylenediamine of the general formula:

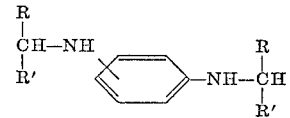

where R and R' is as heretofore defined. The procedure may be conducted under batch or continuous conditions. In the batch operation the reaction mixture and catalyst are preferably maintained in a state of agitation in order to facilitate contact. Under the continuous operation conditions, the amine and ketone reactants are normally passed through a hydrogen pressured catalyst containing reactor such as a fixed bed reactor advantageously at a rate of between about 0.5 and 5.0 volume reaction mixture/volume catalyst/hour.

The N,N'-dialkyl phenylenediamine is recovered by standard means such as stripping off the unreacted dialkyl ketone, formed water and alcohol by-product (if produced) utilizing inert gas (e.g., nitrogen) and reduced pressure when and if necessary. The unreacted ketone may be recycled to the reactor after treatment with calcium chloride to remove water. The stripped residue is then filtered to remove catalyst from the phenylenediamine product. The deposited catalyst can be returned if desired to the reaction zone.

The overall reaction is further described by the following equations:

(1)

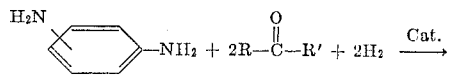

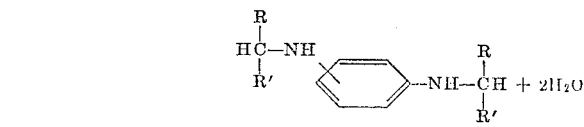

(2)

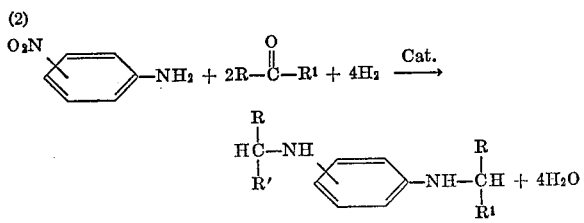

Examples of the amine reactants contemplated herein are p-nitroanaline, m-nitroaniline, o-nitroaniline, p-phenylenediamine, o-phenylenediamine and m-phenylenediamine.

Examples of the ketones contemplated herein are the dialkyl ketones, e.g., acetone, methylethyl ketone, methylpropyl ketone, methylbutyl ketone, methylamyl ketone, methylhexyl ketone, methylheptyl ketone, methyloctyl ketone, ethylethyl ketone, ethylpropyl ketone, ethylbutyl ketone, ethylamyl ketone, ethylhexyl ketone, propylpropyl ketone, propylbutyl ketone, propamyl ketone, propylhexyl ketone, prophylhexyl ketone, butylbutyl ketone, butylamyl ketone and butylhexyl ketone.

Examples of the N,N'dialkyl phenylenediamine products contemplated herein are N,N'di-(1-methylpropyl)-p-phenylenediamine, N,N'di(1 - ethylhexyl)-o-phenylenediamine, N,N'di - (1-propyloctyl)-m-phenylenediamine, and N,N'-di-(1-butyloctyl)-p-phenylenediamine.

The following examples further illustrate the invention but are not to be construed as limitations thereof:

Example I

The example illustrates the preparation of a pretreated catalyst of the invention employed in the manufacture of N,N'-dialkylphenylenediamine and the preparation of comparative catalyst compositions.

The base catalyst subjected to pretreatment was a platinum-alumina composite of individual ⅛ inch spheres having an analysis of 0.37–0.38 platinum, 0.48–0.54 fluorine 0.20–0.25 chlorine and the remainder alumina. Four 50 milliliter volume portions of said base catalyst designated as Catalyst B–E were soaked in 100 ml. portions in a variety of pretreating solutions for 0.5 hour at room temperature (80° F.). In addition a fifth catalyst portion designated as Catalyst F, weighing 4.2 grams was soaked for a 0.5 hour period in 20 cc. of pretreating solution at room temperature (75° F.). A sixth catalyst portion, Catalyst A was used for control. The solutions in which the base catalyst portions were soaked are listed below in Table I.

TABLE I

| Catalyst: | Pretreatment Solution |
|---|---|
| A | None. |
| B | Cyclohexane. |
| C | Desulfurized light straight run Naphta. |
| D | Cyclohexane+Methyldisulfide (640 p.p.m. S). |
| E | Cyclohexane+Hexyl mercaptan (320 p.p.m. S). |
| F | ¹Light Straight Run Naphtha (120 p.p.m. S). |

¹ B.P. 90–250° F.

Example II

This example illustrates the preparation of an N,N'-dialkyl phenylenediamine from nitroaniline, dialkyl ketone and hydrogen utilizing the catalysts of the invention and comparative catalysts prepared in Example I.

Two procedures were employed, a continuous procedure and a batch procedure.

(A) Continuous Procedure.—Through a one inch diameter fixed bed reactor packed with 50 ccs. of a pretreated catalyst described in Example I, there was passed a mixture of methylethyl ketone (MEK) and p-nitroaniline (PNA) in a mole ratio of MEK to PNA of 16:1 under a hydrogen pressure of 400 p.s.i.g. at a temperature of 325° F. and a MEK-PNA mixture rate of 4 ccs./hour/cc. of catalyst. The product exiting from the reactor was stripped and N,N'di(sec. butyl) p-pheneylenediamine was recovered as residue.

(B). Batch Procedure.—A mixture of 119 grams of methylethyl ketone, 21 grams of p-nitroaniline and 4.2 grams of catalyst (mole ratio MEK/PNA=10.8) were placed in a 250 cc. pressure reactor and the reactor was pressured with hydrogen to 450 p.s.i.g. The reactor contents were stirred and the reactor temperature was maintained at 288° F. for a period of 3.3 hours. At the end of the reaction the product stripped at 40 mm. Hg pressure leaving N,N'di(sec. butyl)-p-phenylenediamine product residue.

Catalysts A–E of Example I were utilized in Procedure A and Catalyst F of Example I was employed in Procedure B. The yields of N,N'-di(secondary butyl)-p-phenylene diamine with the various catalyst and procedures are reported below in Table II:

TABLE II

| Pretreated Catalyst | Pretreatment Solution | Yield of N,N'-di-(secondary butyl)-p-phenylenediamine Weight Percent |
|---|---|---|
| A | None | 49.8 |
| B | Cyclohexane | 59.2 |
| C | Desulfurized Light Straight Run Naphtha | 66.9 |
| D | Cyclohexane (320 p.p.m. S) | 89.6 |
| E | Cyclohexane (640 p.p.m. S) | 88.1 |
| F | Non-Desulfurized Light Straight Run Naphtha (120 p.p.m. S). | ¹ 99.4 |

¹ Batch.

As can be seen the run utilizing Catalyst A which had no pretreatment only produced a product yield of 49.8 wt. percent. Another run utilizing Catalyst B which pretreated the catalyst with a liquid aliphatic hydrocarbon at room temperature minus an organic sulfur compound increased the yield of 66.9 wt. percent. This is also true for Catalyst C. However, Catalysts D, E and F which are the pretreated catalysts of the invention respectively produced a yield of 89.6, 88.1 and 99.4 wt. percent or approximately twice that of the non-treated catalyst and approximately one third more than the catalyst treated with non-sulfur containing cycloaliphatic hydrocarbon.

Example III

This example further establishes criticalities in respect to the pretreatment of the catalyst of the invention.

One 50 cc. portion of the platinum on alumina catalyst described in Example I was soaked in 100 cc. of benzene at 80° F. A second 50 cc. portion was soaked at 80° F. in 100 cc. solution of benzene and thiophene, said solution having a sulfur(s) content of 120 p.p.m. The respective catalytic portions were utilized in identical procedure in the preparation of N,N'-di(sec. butyl)-p-phenylenediamine from MEK and PNA by the method of the invention. The yield of N,N' phenylenediamine product in the run utilizing the benzene treated catalyst was 65.9% wt. percent and the yield with the benzene+thiophene treated catalyst was 64.7 wt. percent indicating that when the catalyst pretreatment solution is predominately aromatic hydrocarbon there is no increase in catalytic activity by the presence of a sulfur compound in the pretreatment solution.

In addition to the foregoing in further runs where the platinum-alumina catalyst employed was pretreated solely with hydrogen or a mixture of cyclohexane and hydrogen, the yields of N,N'-di(sec. butyl)-p-phenylenediamine were respectively only 61.4 and 62.3 wt. percent whereas in a comparative run using a catalyst pretreated with a cyclohexane-thiophene solution (320 p.p.m.s.)

gave an outstanding yield of N,N'di(sec. butyl)-p-phenylenediamine of 90.3 wt. percent.

I claim:
1. A method of producing an N,N'-dialkyl phenylenediamine of the formula:

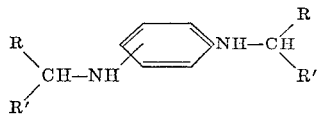

where R and R' are the same or different alkyl radicals of from 1 to 10 carbons comprising contacting a mixture of an amine selected from the group of phenylenediamine or nitroaniline and a dialkyl ketone of the formula:

where R and R' are as heretofore defined with hydrogen under a hydrogen pressure of between about 200 and 1500 p.s.i.g. at a temperature between about 250 and 350° F. in a mole ratio of said ketone to said amine of between about 5:1 and 16:1 in the presence of a catalyst comprising carrier oxide of a non-precious metal taken from Groups III to VIII of the Periodic Table and from about 0.1 to about 10 wt. percent of a platinum metal, said catalyst having been pretreated with a pretreatment solution composed of (1) a liquid aliphatic hydrocarbon of an aromatic content of less than 50 wt. percent and (2) a sulfur component selected from the group of hydrogen sulfide or an organic sulfur compound soluble in said liquid aliphatic hydrocarbon composed of carbon, hydrogen and sulfur, said sulfur component being present in an amount sufficient to give said solution a sulfur content of between about 50 p.p.m. and 2 wt. percent.

2. A method in accordance with claim 1 wherein said phenylenediamine is N,N'-di(sec. butyl)-p-phenylenediamine, said nitroaniline is p-nitroaniline, said ketone is methylethyl ketone, said platinum metal is platinum, said carrier oxide is aluminum oxide, said aliphatic hydrocarbon is cyclohexane and said sulfur component is dimethyl sulfide.

3. A method in accordance with claim 1 wherein said phenylenediamine is N,N'-di(sec. butyl)-p-phenylenediamine, said nitroaniline is p-nitroaniline, said ketone is methylethyl ketone, said platinum metal is platinum, said carrier oxide is aluminum oxide, said aliphatic hydrocarbon is cylohexane and said sulfur component is hexyl mercaptan.

4. A method in accordance with claim 1 wherein said phenylenediamine is N,N'-di(sec. butyl)-p-phenylenediamine, said nitroaniline is p-nitroaniline, said ketone is methylethyl ketone, said platinum metal is platinum, said carrier oxide is aluminum oxide, said aliphatic hydrocarbon is cyclohexane and said sulfur component is thiophene.

5. A method in accordance with claim 1 wherein said phenylenediamine is N,N'-di(sec. butyl)-p-phenylenediamine, said nitroaniline is p-nitroaniline, said ketone is methylethyl ketone, said platinum metal is platinum, said carrier oxide is aluminum oxide, and said pretreatment solution is non-desulfurized light straight run naphtha.

References Cited

UNITED STATES PATENTS 2,323,948  7/1943  Von Bramer et al. ___ 260—577

CHARLES B. PARKER, *Primary Examiner.*

P. C. IVES, *Assistant Examiner.*